(12) United States Patent
Gagne et al.

(10) Patent No.: US 10,794,332 B2
(45) Date of Patent: Oct. 6, 2020

(54) MICROFLUIDIC HOMOGENEOUS CATALYZATION SYSTEMS AND METHODS, AND APPARATUSES INCORPORATING SAME

(71) Applicant: The University of Vermont and State Agricultural College, Burlington, VT (US)

(72) Inventors: Kevin R. Gagne, Manchester, NH (US); Darren L. Hitt, Burlington, VT (US); Michael Ryan McDevitt, Burlington, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 933 days.

(21) Appl. No.: 15/354,508

(22) Filed: Nov. 17, 2016

(65) Prior Publication Data

US 2017/0138309 A1    May 18, 2017

Related U.S. Application Data

(60) Provisional application No. 62/256,175, filed on Nov. 17, 2015.

(51) Int. Cl.
| | |
|---|---|
| *F02K 9/56* | (2006.01) |
| *F02K 9/42* | (2006.01) |
| *F02K 9/94* | (2006.01) |
| *B64G 1/40* | (2006.01) |
| *F02K 9/88* | (2006.01) |
| *B64G 1/26* | (2006.01) |

(52) U.S. Cl.
CPC ............... *F02K 9/56* (2013.01); *B64G 1/401* (2013.01); *B64G 1/402* (2013.01); *F02K 9/425* (2013.01); *F02K 9/88* (2013.01); *F02K 9/94* (2013.01); *B64G 1/26* (2013.01)

(58) Field of Classification Search
CPC ... B64G 1/402; F02K 9/50; F02K 9/56; F02K 9/58
See application file for complete search history.

(56) References Cited

U.S. PATENT DOCUMENTS

2016/0109467 A1* 4/2016 Kolb ................ G01N 33/80
435/7.25

OTHER PUBLICATIONS

Chen "A homogeneously catalyzed micro-chemical thruster" (Year: 2003).*
Chen "Computational Study of a MEMS-Based Catalyzed Micro-Thruster with Homogeneous Chemical Reaction" (Year: 2007).*
(Continued)

*Primary Examiner* — Scott J Walthour
*Assistant Examiner* — William L Breazeal
(74) *Attorney, Agent, or Firm* — Downs Rachlin Martin PLLC (57) ABSTRACT

Systems, apparatuses, and methods for generating hot gases based on catalyzation involving flowing catalyst. Catalysis occurs in a flow-type mixing catalyzation channel in which a liquid catalyst mixes with a liquid reactant flowing in a desired flow regime, such as a striated (laminar) flow regime or a slug flow regime. Devices such as micro-thrusters for satellite and other applications and hot gas generators for powering another device, such as an electrical generator, can be made using one or more flow-type mixing catalyzation channels.

20 Claims, 8 Drawing Sheets

(56) References Cited

OTHER PUBLICATIONS

McDevitt "Enhanced Laminar Mixing in Multifluid Droplets via Multiphase Flow in a Microchannel" (Year: 2013).*

Chen Zupeng, et al., "A homogeneously catalyzed micro-chemical thruster", Sensors and Actuators A Physical; vol. 108, pp. 149-154, 2003; www.sciencedirect.com.

McDevitt, M. Ryan, "Numerical Study of Disperse Monopropellant Microslug Formation at a Cross Junction", Oct. 2011; pp. 1-103.

McDevitt, M. Ryan et al., "Enhanced Homogeneous Catalysis in a Monopropellant Microthruster", American Institute of Aeronautics and Astronautics; pp. 1-13; Proceedings of AIAA SciTech 2015, AIAA, Kissimmee, FL, 2015.

* cited by examiner

MICROFLUIDIC HOMOGENEOUS CATALYZATION SYSTEMS AND METHODS, AND APPARATUSES INCORPORATING SAME

RELATED APPLICATION DATA

This application claims the benefit of priority of U.S. Provisional Patent Application Ser. No. 62/256,175 filed on Nov. 17, 2015, and titled "MICROFLUIDIC HOMOGENEOUS CATALYSIS SYSTEMS AND METHODS, AND APPARATUSES INCORPORATING SAME", which is incorporated herein by reference in its entirety.

STATEMENT REGARDING FEDERALLY SPONSORED RESEARCH OR DEVELOPMENT

This invention was made with Government support under Grant No. 25399 YR4 SBIR awarded by the Vermont Experimental Program to Stimulate Competitive Research (EPSCoR); Grant No. NN09AO60A awarded by the National Aeronautics and Space Administration (NASA); and Grant No. FA9550-06-1-0364 awarded by the Air Force Office of Scientific Research (AFOSR). The government has certain rights in this invention.

FIELD OF THE INVENTION

The present invention generally relates to the field of microfluidics. In particular, the present invention is directed to microfluidic homogeneous catalyzation systems and methods, and apparatuses incorporating same.

BACKGROUND

Catalysis systems are known, for example, in the field of miniaturized monopropellant propulsion systems. The majority of focus of work in this field has been on heterogeneous catalyzation-based systems using solid catalyst beds, for example, in the form of pillar arrays, into which a liquid monopropellant is flowed to cause the catalytic process that decomposes the monopropellant to generate expanding gas that results in thrust. Heterogeneous catalyzation-based monopropellant propulsion systems have limitations due to the need to force the monopropellant through the catalyst beds that can provide significant flow resistance. In at least one case, researchers experimented with using homogeneous catalysis, which uses a liquid monopropellant and a liquid catalyst as the basis for a micro-thruster. However, in that experiment the mixing of the monopropellant and catalyst was quite inefficient.

SUMMARY OF THE DISCLOSURE

In one implementation, the present disclosure is directed to a catalyzation system that includes a liquid monopropellant source containing a liquid monopropellant; a liquid catalyst solution source containing a liquid catalyst solution; an elongated mixing catalyzation channel having a hydraulic diameter less than 5 mm; a liquid monopropellant inlet in fluid communication with the liquid monopropellant source; and a liquid catalyst solution inlet in fluid communication with the liquid catalyst solution source and located proximate to the liquid monopropellant inlet; and a flow control system designed and configured to control flow of each of the liquid monopropellant and liquid catalyst solution to, respectively, the liquid monopropellant inlet and the liquid catalyst solution inlet so as to create one or the other of 1) striated laminar flow and 2) slug flow in the elongated mixing catalyzation channel.

In another implementation, the present disclosure is directed to a propulsion thruster designed and configured to operate using a liquid monopropellant and a corresponding liquid catalyst solution. The propulsion thruster includes an elongated mixing catalyzation channel having a hydraulic diameter less than 5 mm; a liquid monopropellant inlet; a liquid catalyst solution inlet located proximate to the liquid monopropellant inlet; and an outlet located distally from the liquid monopropellant inlet and the liquid catalyst solution inlet; and a propelling nozzle located proximate to the outlet of the elongated mixing catalyzation channel and in fluid communication with the elongated mixing catalyzation channel.

In still another implementation, the present disclosure is directed to a spacecraft that includes a liquid monopropellant storage reservoir designed and configured to store a liquid monopropellant; a liquid catalyst solution storage reservoir designed and configured to store a liquid catalyst solution; a propulsion thruster that includes an elongated mixing catalyzation channel having a hydraulic diameter less than 5 mm; a liquid monopropellant inlet in fluid communication with the liquid monopropellant storage reservoir; a liquid catalyst solution inlet located proximate to the liquid monopropellant inlet, the liquid catalyst solution inlet in fluid communication with the liquid catalyst solution storage reservoir; and an outlet located distally from the liquid monopropellant inlet and the liquid catalyst solution inlet; and a propelling nozzle located proximate to the outlet of the elongated mixing catalyzation channel and in fluid communication with the elongated mixing catalyzation channel; and a flow control system designed and configured to control flow of each of the liquid monopropellant and liquid catalyst solution to, respectively, the liquid monopropellant inlet and the liquid catalyst solution inlet so as to create one or the other of 1) striated laminar flow and 2) slug flow in the elongated mixing catalyzation channel.

In a further implementation, the present disclosure is directed to a method of making a thruster. The method includes forming a homogeneous mixing catalyzation channel using additive manufacturing; forming at least one monopropellant input channel using additive manufacturing, wherein the at least one monopropellant input channel is in fluid communication with the homogeneous mixing catalyzation channel; forming at least one catalyst input channel using additive manufacturing, wherein the at least one catalyst input channel is in fluid communication with the homogeneous mixing catalyzation channel; and forming at least one nozzle using additive manufacturing, wherein the at least one nozzle is in fluid communication with the homogeneous mixing catalyzation channel.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Some aspects of the present invention are directed to systems and methods for generating hot gasses from the exothermic decomposition of a suitable chemical (hereinafter, "a monopropellant") initiated by a liquid catalyst in a microfluidic flow regime, such as in a fluid-flow-mixing catalyzation channel having a hydraulic diameter in a range of about 5 μm up to about 5 mm. Using these systems and methods, the hot gasses can be generated with low input power (when compared to a catalyst bed), low pressure drop (when compared to a catalyst bed), and reduced design and manufacturing cost (when compared to a catalyst bed). These gases are suitable, for example, for driving a turbine or piston motor, or for satellite propulsion or other vehicle propulsion. The specific examples illustrated are suited to space applications; however, those skilled in the art will readily understand the variety of applications to which the microfluidic fluid flow catalyzation systems and methods of the present disclosure can be applied.

Generally, in methods disclosed herein, an inorganic catalyst (e.g., ferric chloride) of 1% to 50%, by weight, dissolved in an inert solvent (e.g., water) or a combustible solvent (e.g., methanol), when mixed in the proper ratio with a monopropellant (e.g., hydrogen peroxide) in a controlled manner, results in spontaneous, rapid, exothermic decomposition of the monopropellant. Adiabatic flame temperatures of at least 1100 K for an inert solvent and at least 2300 K for a combustible solvent can be achieved. This can produce a specific impulse of 75-160 s and 200-330 s, respectively.

Important advantages of a system of the present disclosure all stem from the removal of the catalyst bed present in conventional monopropellant systems. Consequences of this include:

Pressure Drop: For many small spacecraft, there are limitations to the pressurization of fuel storage tanks. CubeSats (see, e.g., www.cubesat.org), for example, are limited to fuel pressurization of no more than 1.2 atm. One of the largest sources of pressure drop in a micro-thruster is a traditional catalytic chamber, where liquid is forced through a densely-packed catalyst bed. If the pressure drop through the catalyst bed is too high, the flow rate can be significantly decreased, with a proportional decrease in thrust. The invention precludes the necessity of a catalyst bed, and so there is no pressure drop associated with the catalytic chamber.

Preheating: One technique that has been adopted for overcoming issues associated with incomplete decomposition at the microscale is to preheat the catalyst bed, typically with an electric heater (e.g. a thermal resistive heater). By raising the temperature of the catalyst bed, monopropellant entering the chamber will be closer to the auto-decomposition temperature. This preheating can require significant power; the "Green Monopropellant Thruster," available from Busek Company, Inc., Natick, Mass., (which uses a preheated catalyst bed) requires 4.5 W to 50 W, depending on model. This is a prohibitive level of power for many small satellite applications. The present invention requires no power to initiate decomposition; the only power draw is the valve operation. This draw will be double a standard system (as it requires controlling two fluids, compared to one for a standard system) and is, in some embodiments, in the vicinity of 2 W.

Ease of Manufacture/Cost: Catalytic beds are one of the largest costs when developing a chemical propulsion system, as they are challenging to manufacture and often use precious metals (e.g., Ag, Ir, Pt). By eliminating the catalyst bed, these expenses are eliminated.

The removal of the catalyst bed has far-reaching ramifications. For example, this allows for micro-thruster designs that can be additively manufactured (3D printed) or MEMS-manufactured in a single step. Further, this allows for thrusters that can be 3D printed integrally with other structure of a satellite or other device. A second impact on manufacturing is that the "catalyst chamber" can simply be a fluid-flow-mixing catalyzation channel in which the fluids mix. Since there does not need to be a catalyst bed in this fluid-flow-mixing catalyzation channel, it does not need to be a long, straight channel, which means it can be designed to fit in more compact spaces (e.g., by making the fluid-flow-mixing catalyzation channel a serpentine path to achieve the required mixing length).

When operated purely as a monopropellant thruster, a homogeneous fluid-flow catalysis system has a decrease in total impulse when compared to an equivalent heterogeneously catalyzed system. Total impulse is the thrust produced by the system multiplied by the amount of time the thruster can run, which is directly proportional to the amount of fuel on board. When the system is operated as a monopropellant (i.e., when the catalyst is dissolved in an inert liquid such as water) there is a reduction in performance, as the mass of inert water carried does not contribute to the total impulse. In a mass- or volume-constrained environment such as for a CubeSat, this impact on total impulse is related to the ratio of aqueous catalyst required to achieve complete decomposition. For example, if there is a 4:1 ratio of monopropellant to aqueous catalyst, then the invention would have a 20% reduction in total impulse when compared to a traditional catalyst-bed-based monopropellant thruster. This disadvantage may tend to reduce the applicability of the certain embodiments of the present invention for large scale systems, wherein a catalyst bed does not inhibit performance. Conversely, this disadvantage can be eliminated by using a combustible solvent (such as alcohol), in which case the system would offer equivalent performance to a bipropellant thruster using a traditional catalyst bed.

Exemplary List of Possible Monopropellant/Catalyst Combinations

Requirements for operation of a system of the present disclosure are a monopropellant, an inorganic catalyst, and a polar solvent. The monopropellants of significance are hydrogen peroxide, hydroxlammonium-nitrate-based blends and ammonium dinitramide-based blends. Decomposition for each of these are catalyzed by various metals; while there are long lists of these, the only ones of relevance to certain embodiments of the invention are those that are soluble in liquid. Specific combinations of importance to the propulsion or energy generation application include:

For hydrogen peroxide, catalysts:
  $Fe(III)Cl_3$
  $Fe(II)Cl_3$
  $MnO_4$
  KI
For hydroxlammonium-nitrate (HAN)-based (e.g., AF-M315E), catalysts:
  $Ir/A_2O_3$
  $Pt/A_2O_3$
For ammonium dinitramide (ADN) (e.g., FLP-106), catalysts:
  $NH^{4+}$
  $H^{2+}$ Each of these should be soluble in a polar solvent, such as water, among others.

Alcohol as a Solvent

Techniques described herein allow for operation as a monopropellant, but they can also be used for a bipropellant if the monopropellant is also an oxidizer (e.g., hydrogen peroxide). An illustrative example is a hydrogen peroxide/2-propanol bipropellant rocket. 2-propanol can be used as the solvent for a variety of appropriate catalysts, for example $Fe(III)Cl_3$. When the 2-propanol solution and hydrogen peroxide are introduced into an appropriate fluid-mixing catalyzation channel, the decomposition provides the heat and the oxygen required for combustion. The result is a much higher adiabatic flame temperature (2600 K) than a hydrogen peroxide thruster (1100 K).

This feature has been demonstrated using 2-propanol, ethanol, hexanol, methanol, and n-hexane as solvents and hydrogen peroxide as the oxidizer. In each case, spontaneous combustion is achieved by mixing the products in a proper ratio. Alcohols that are non-polar solvents, such as isopropyl alcohol and butanol, are not appropriate for this application as most known catalysts for hydrogen peroxide are insoluble in non-polar solvents.

Another feature of a combustible solvent is the possibility of dual-mode operation. In this scenario, the ratio of monopropellant and combustible solvent can be controlled using suitable control means, such as using proportional valves, to control the flow rate entering the mixing chamber in order to offer performance ranging between the performance of a monopropellant (moderate thrust) and the performance of a bipropellant (high thrust). The former performance level is appropriate for attitude control, while the latter is appropriate for primary propulsion. This flexibility is of paramount importance for mass- and volume-constrained environments, such as spacecraft.

Monopropellant/Catalyst Ratios

Figure 1:
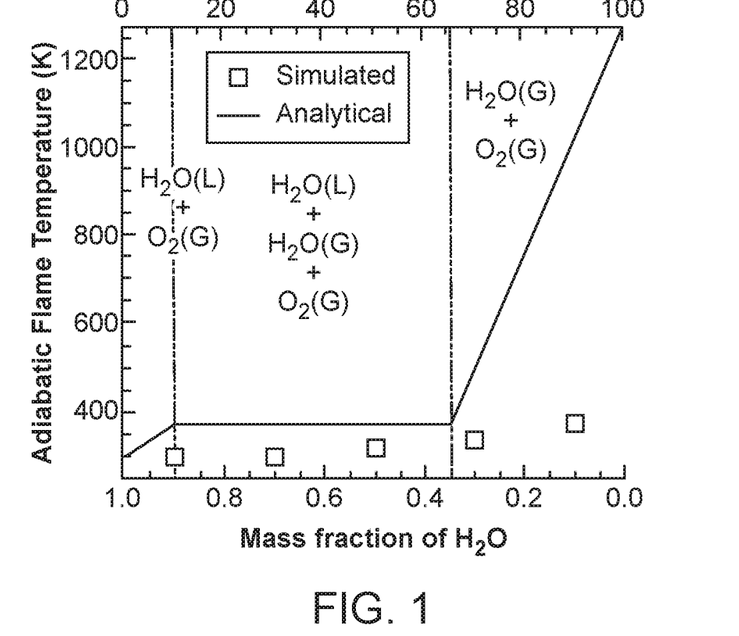
FIG. 1 is a graph of adiabatic flame temperature of hydrogen peroxide decomposition versus mass fraction of water.

For a liquid monopropellant, some of the energy released during decomposition is required to raise the liquid to vaporization temperature and to vaporize the products. If there is insufficient chemical energy available, there will be incomplete decomposition and, consequently, poor performance. This requirement sets the minimum concentration of monopropellant that is required for operation. For a hydrogen peroxide/water mixture, and as illustrated in FIG. 1, this requires that at least 67% of the liquid is hydrogen peroxide to have sufficient chemical energy to vaporize all of the products.

For a homogeneously catalyzed system, wherein the inputs are 90% hydrogen peroxide and an aqueous catalyst, this requires that the minimum ratio of hydrogen peroxide to catalyst being mixed is 3:1.

For operation as a bipropellant thruster, the ratio of oxidizing agent (e.g., hydrogen peroxide) to fuel (e.g., 2-propanol) is a driving factor. This may make some combinations of oxidizer and fuel inefficient if the ratios required for generating decomposition varies significantly from the ratios required for combustion. This may be mostly a theoretical concern, as all of the fuels tested did not have this problem.

Exemplary Embodiments

Propulsion—Striated Flow

Figure 2A:
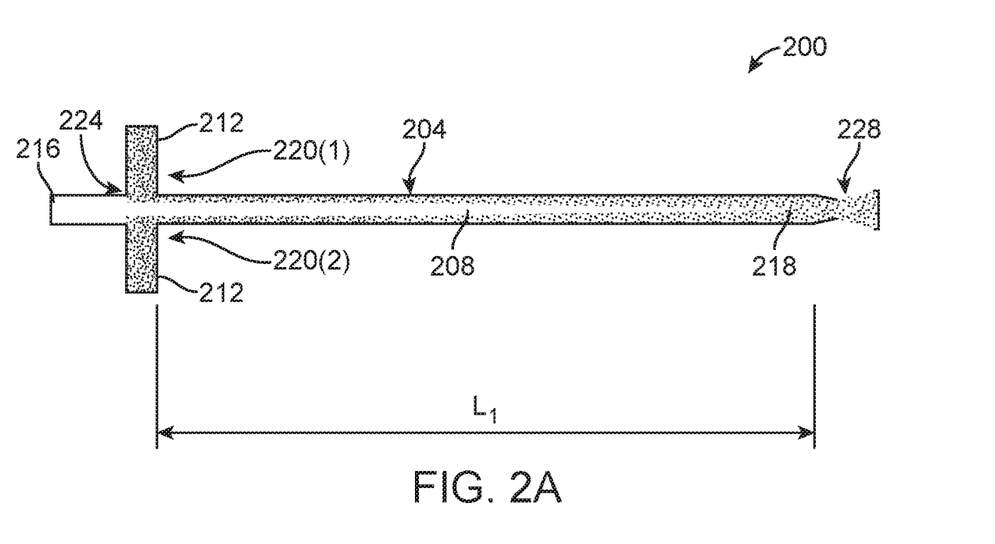
FIG. 2A is a diagrammatic view of an exemplary combustion device that includes a striated-flow mixing catalyzation channel having two monopropellant inputs and a single aqueous catalyst input.

For striated-flow mixing catalyzation channels, such as striated-flow mixing catalyzation channels 204 and 304 of FIGS. 2A and 3, respectively, described below, having hydraulic diameters between 500 μm and 5 mm, mixing in a microfluidic channel can be accomplished by creating laminar flow (e.g., flow with a Reynolds Number from 1 to 100), for example using a technique such as any of the techniques illustrated in the examples of FIGS. 2A, 2B, and 3. Due to the low Reynolds number observed at these dimensions, introducing new liquids into the striated-flow mixing catalyzation channel will result in a layered flow. At each interface between the monopropellant and catalyst, these materials will react with one another. In a simple configuration, the monopropellant and aqueous catalyst meet at a cross junction, with a single layer of catalyst between two layers of monopropellant, and this is illustrated in FIG. 2A. Increasing the number of layers, such as illustrated in FIG. 3, increases the surface area for reaction, which decreases the length required to achieve complete decomposition. Thus, with everything other than the number of layers being equal, the length L2 of striated-flow mixing catalyzation channel 304 of FIG. 3 can be shorter than length L1 of striated-flow mixing catalyzation channel 204 of FIG. 2A.

FIG. 2A illustrates an exemplary combustion device 200 having a striated-flow mixing catalyzation channel 204 that provides initial striated flow 208 of a monopropellant 212 and a catalyst 216 and a length, L1, that allows the monopropellant and catalyst to mix and react with one another to form high-temperature gases 218. In this example, striated-flow mixing catalyzation channel 204 has two monopropellant inputs 220(1) and 220(2) and a single catalyst input 224. In the embodiment shown, combustion device 200 further includes a supersonic micronozzle 228 for providing a thrust. Monopropellant 212 and catalyst 216 may be any suitable monopropellant and catalyst combination, such as any of the monopropellant and catalyst combinations noted above.

Figure 2B:
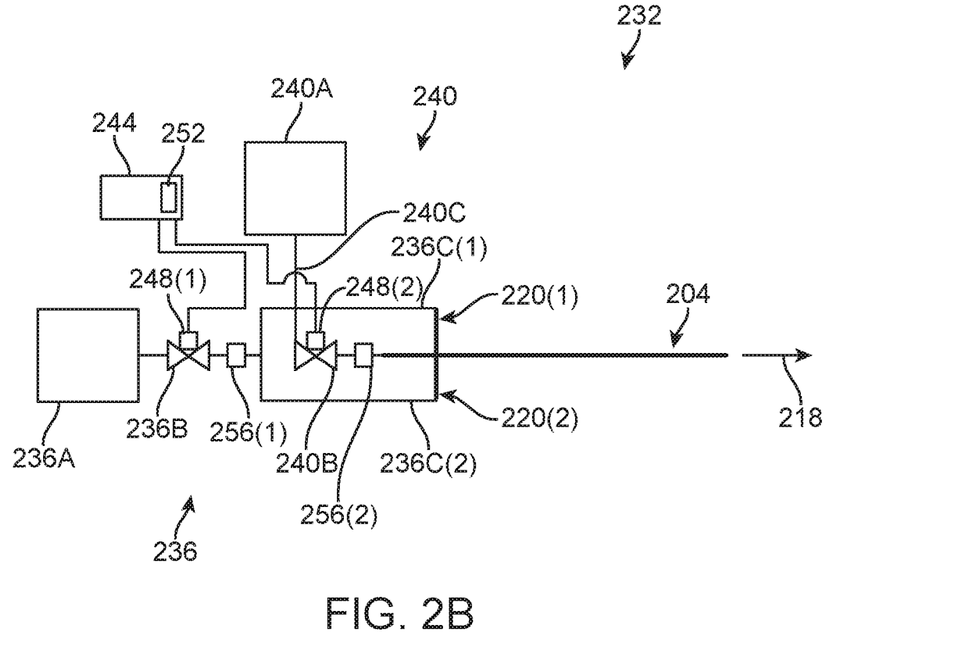
FIG. 2B is a schematic diagram of an exemplary striated-flow combustion system that includes the exemplary combustion device of FIG. 2A.
Figure 3:
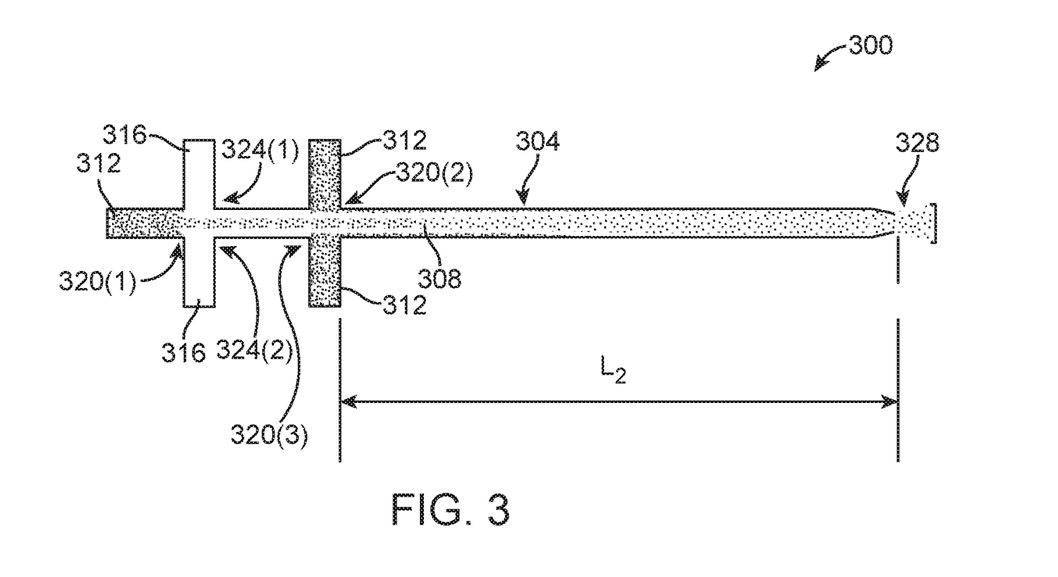
FIG. 3 is a diagrammatic view of an exemplary combustion device that includes a striated-flow mixing catalyzation channel having three monopropellant inputs and two aqueous catalyst inputs.

FIG. 2B illustrates an exemplary laminar-flow combustion system 232 that includes combustion device 200. In this example, laminar-flow combustion system 232 includes a monopropellant delivery system 236 that includes a pressurized monopropellant storage tank 236A, a monopropellant flow control valve 236B (e.g., a proportional valve), and a pair of delivery conduits 236C(1) and 236C(2) fluidly connected to monopropellant inputs 220(1) and 220(2) of striated-flow mixing catalyzation channel 204. Laminar-flow combustion system 232 also includes a catalyst delivery system 240 that includes a pressurized catalyst storage tank 240A, a catalyst flow control valve 240B (e.g., a proportional valve), and a delivery conduit 240C fluidly connected to catalyst input 224 of striated-flow mixing catalyzation channel 204. By varying the flow rates of the liquids entering striated-flow mixing catalyzation channel 204, the output (e.g., thrust) of laminar-flow combustion system 232 can be varied. By controlling the monopropellant and catalyst flow rates via proportional valves 236B and 240B, respectively, the temperature of exhaust gases 218 can be controlled. These flow rates are directly related to the ratio of monopropellant 212 to catalyst 216 desired. For example, to achieve a 4:1 ratio in system 232 shown in FIG. 2B, the flow rate of monopropellant 212 should be four times higher than the flow rate of catalyst 216. Laminar-flow combustion system 232 of FIG. 2B may include a flow control system 244 that automatically controls monopropellant and catalyst flow control valves 236B and 240B, respectively, so that the system produces the desired output. Control system 244 may include suitable valve actuators 248(1) and 248(2) controlled by a microprocessor-based controller 252.

In a specific example, dispensing of monopropellant 212 and catalyst 216 may be based on conditions within monopropellant and catalyst storage tanks 236A and 240A, respectively. For example, based on tank pressure and known flow coefficients for valves 236B and 240B and given a valve opening time, it is known how much of each of monopropellant 212 and catalyst 216 is flowing into striated-flow mixing catalyzation channel 204. In some embodiments, an appropriately sized mass-flow sensor 256(1) and 256(2) may be used downstream of each of monopropellant and catalyst flow control valves 236B and 240B and upstream of the corresponding inputs 220(1), 220(2), and 224 to striated-flow mixing catalyzation channel 204 to gain more accurate information on the inlet conditions of the striated-flow mixing catalyzation channel 204. In some embodiments and for either monopropellant operation or dual mode operation involving oxidation, a temperature sensor (not shown) in communication with a control system, such as control system 244, can be used to monitor temperature within the striated-flow mixing catalyzation channel. The control system can use the monitored temperature as feedback to control a catalyst flow control valve, such as catalyst control valve 240B, to control the amount of catalyst entering the striated-flow mixing catalyzation channel; for example, less catalyst is needed as the channel temperature increases. In some applications, the increased complexity and cost of deploying a temperature monitoring and feedback system may not justify the catalyst savings.

FIG. 3 illustrates another exemplary combustion device 300 having a striated-flow mixing catalyzation channel 304 that provides initial striated flow 308 of a monopropellant 312 and a catalyst 316 and a length, L2, that allows the monopropellant and catalyst to mix and react with one another to form a high-temperature gas. In this example, striated-flow mixing catalyzation channel 304 has three monopropellant inputs 320(1) to 320(3) and two catalyst inputs 324(1) and 324(2). In the embodiment shown, combustion device 300 further includes a supersonic micronozzle 328 for providing a thrust. Monopropellant 312 and catalyst 316 may be any suitable monopropellant and catalyst combination, such as any of the monopropellant and catalyst combinations noted above. Although not shown, the flows of monopropellant 312 to monopropellant inputs 320(1) to 320(3) may be routed and controlled in any suitable manner, such as using multiple delivery conduits and/or one or monopropellant flow control valves. Similarly, the flows of catalyst 316 to catalyst inputs 324(1) and 324(2) may be routed and controlled in any suitable manner, such as using multiple delivery conduits and/or one or more catalyst flow control valves.

Propulsion-Slug Flow

For mixing catalyzation channel sizes between 5 μm and 500 μm, a slug flow regime can be a more appropriate mixing technique for a particular application. In a slug-flow mixing catalyzation channel, an inert gas, an aqueous catalyst, and the monopropellant are controllably introduced at a junction, resulting in the formation of discrete liquid slugs of monopropellant and catalyst interspersed by gas bubbles, as illustrated in the exemplary slug-flow combustion system 400 of FIG. 4A.

Figure 4A:
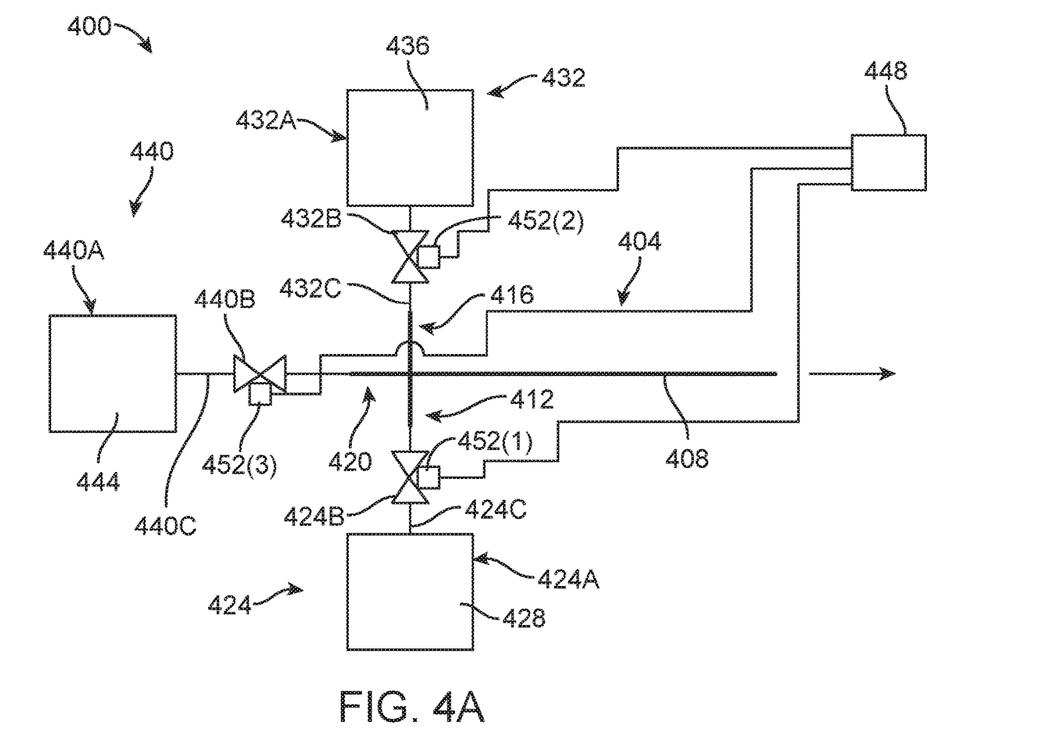
FIG. 4A is a schematic diagram of an exemplary slug-flow combustion system that includes a combustion device comprising a slug flow mixing catalyzation channel having two monopropellant inputs and a single catalyst input.

Referring to FIG. 4A, in this example, slug-flow combustion system 400 includes a combustion device 404 comprising a slug-flow mixing catalyzation channel 408 having three inputs, namely, a monopropellant input 412, a catalyst input 416, and an inert-gas input 420. A monopropellant delivery system 424 provides a monopropellant 428 to monopropellant input 412, a catalyst delivery system 432 provides a catalyst 436 to catalyst input 416, and an inert-gas delivery system 440 provides an inert gas 444 to inert-gas input 420. In this embodiment, monopropellant delivery system 424 includes a pressurized monopropellant tank 424A, a valve 424B (e.g., a proportional valve), and a delivery conduit 424C in fluid communication with monopropellant input 412 of slug-flow mixing catalyzation channel 408. Catalyst delivery system 432 includes a pressurized catalyst tank 432A, a valve 432B (e.g., a proportional valve), and a delivery conduit 432C in fluid communication with catalyst input 416 of slug-flow mixing catalyzation channel 408. Inert gas delivery system 440 includes a pressurized inert-gas tank 440A, a valve 440B (e.g., a proportional valve), and a delivery conduit 440C in fluid communication with inert-gas input 420 of slug-flow mixing catalyzation channel 408. Also in the embodiment shown, slug-flow combustion system 400 includes a controller 448 in operative communication with valve actuators 452(1) to 452(3) that control, respectively, valves 424B, 432B, and 440B. When appropriately programmed, controller 448 controls valve actuators 452(1) to 452(3) to create discrete slugs 456

(FIG. 4B), each containing a portion of monopropellant 428 and a portion of catalyst 436, separated by volumes 460 of inert gas 444. Exemplary control schemes for slug-flow-based embodiments may be nearly identical to the exemplary control schemes described above relative to FIG. 4 but with the additional system input of the inert gas.

Each slug 456 (FIG. 4B) develops an internal recirculation as it moves down slug-flow mixing catalyzation channel 408, which results in enhanced mixing, and a decrease in the length L" of the slug-flow mixing catalyzation channel over which decomposition occurs when compared to purely laminar flow. One example of this improvement comes from a study performed of flow in a 50 μm×20 μm microchannel. In that study, numerical simulations of hydrogen peroxide and water being pumped into the microchannel were performed. Laminar flow and slug (or Taylor) flow were both simulated, and the mixing (characterized by the maximum variance of concentration of hydrogen peroxide) was measured at a number of discrete locations in the microchannel. FIG. 5 is a graph showing the results of these simulations in which the slug flow offers nearly two times the mixing at 1000 μm downstream and nearly seven times the mixing at 4000 μm.

Figure 4B:
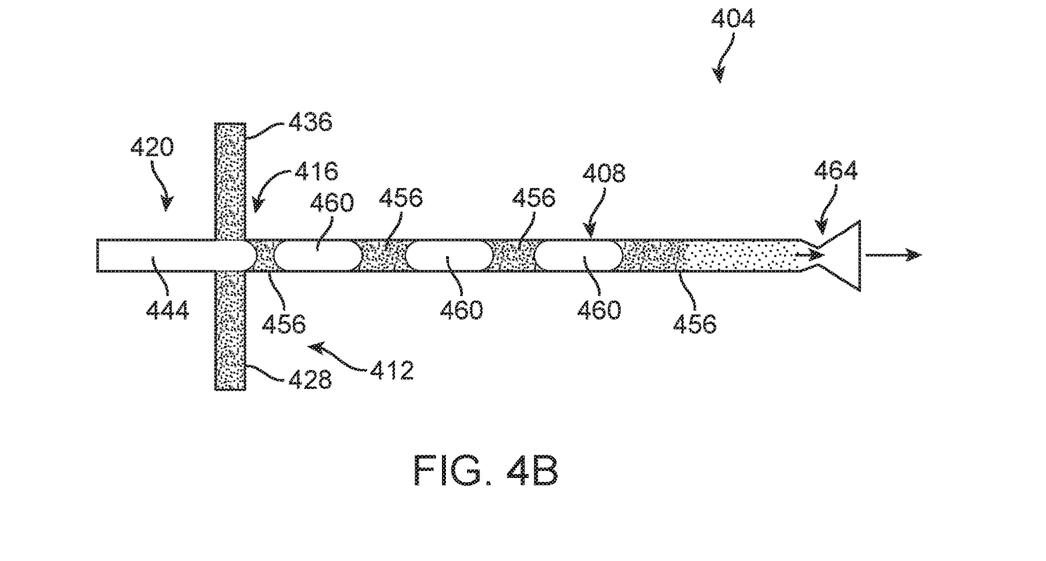
FIG. 4B is a diagrammatic view of the combustion device of FIG. 4A.
Figure 5:
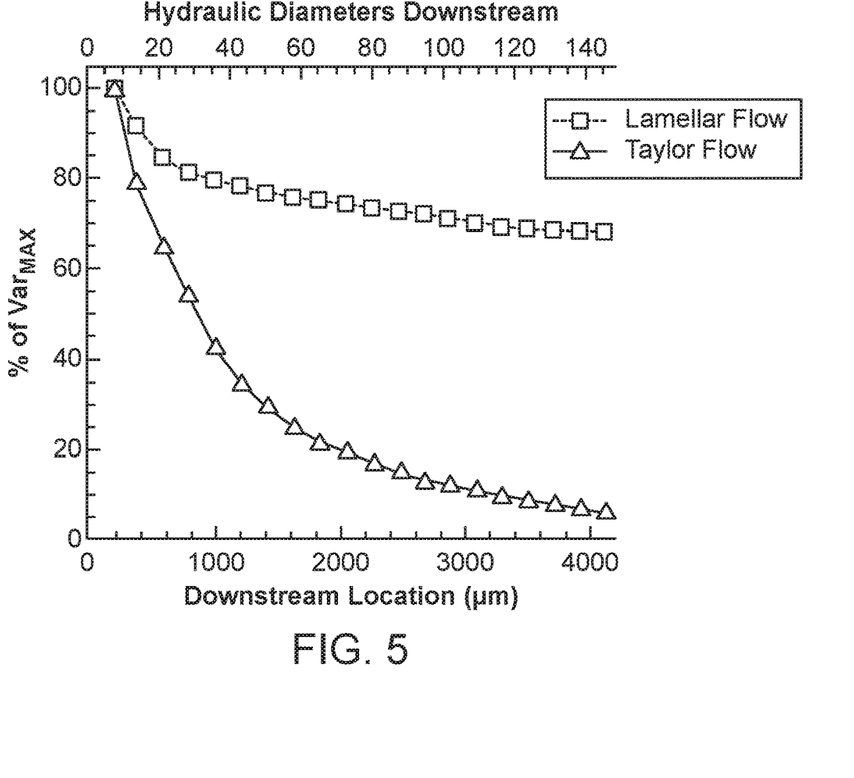
FIG. 5 is a graph showing a plot of maximum variance of laminar flow vs. slug (or Taylor) flow.

In the embodiment shown, combustion device 404 of FIG. 4B also includes a supersonic micronozzle 464, such as may be present in a micro-thruster. An additional feature of slug-flow operation is the ability to throttle thrust by varying the size of inert gas volumes 460. Increasing the length of gas volumes 460 (which can be accomplished, for example, by increasing the pressure of inert gas 444 relative to the pressure of catalyst 436 and monopropellant 428) results in a decrease in thrust, and conversely a decrease in the length of gas volumes results in an increase in thrust. This throttling has been shown to decrease the thrust by up to 50% when compared with a system with no inert gas volumes.

Non-Propulsive Applications

Both of the mixing catalyzation techniques (striated/slug) described herein can be used to generate hot gasses in mini- and micro-scale channels. These hot gasses could be used to turn a turbine or piston motor to generate power, such as in a portable power generation unit. In this configuration, the supersonic propelling micronozzle illustrated, for example, in FIGS. 2A, 3, and 4B, would be removed from the channel, and a turbine or piston motor would replace it. The rapid expansion of hot gasses formed by mixing the monopropellant and catalyst solutions creates the driving force for the turbine or piston motor. This is illustrated in FIG. 6, which shows a system 600 that includes a flow-type mixing catalyzation system 604, a power converter 608, and a driven device 612.

Flow-type mixing catalyzation system 604 includes one or more mixing catalyzation devices 616, each of which may be of the striated or slug type described above or of a universal type that can provide both flow regimes under proper control of the mixing catalyzation system. As mentioned above, a difference between each mixing catalyzation device 616 and mixing catalyzation devices 200, 300, and 404 of FIGS. 2A, 3, and 4B, respectively, is that it may not have a thrust nozzle like thrust nozzles 228, 328, and 464 of FIGS. 2A, 3, and 4B. Power converter 608 converts energy from flow-type mixing catalyzation system 604, such as from the expanding gas generated thereby, into mechanical energy. For example, power converter 608 can be a gas turbine or piston motor, among other things. Driven device 612 can be any suitable device driven by power converter 608. In one example, driven device 612 is an electrical generator.

Figure 6:
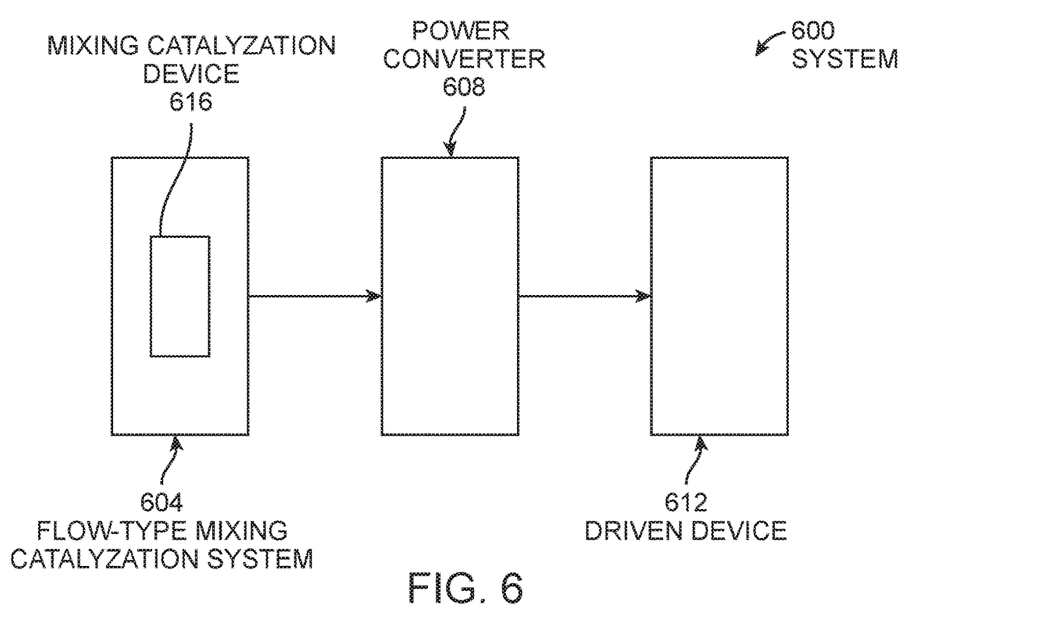
FIG. 6 is a high-level block diagram illustrating a power generating system that is driven by a mixing catalyzation system.

An example of a system that system 600 of FIG. 6 can be configured to emulate or replace is an emergency power unit (EPU) of a F-16 Fighting Falcon made by General Dynamics/Lockheed Martin Aeronautics. That EPU uses the catalyzed decomposition of hydrazine to drive a turbine and electrical generator to generate electrical power if the F-16 main engines go offline. A system made in accordance with aspects of the present invention could use a similar concept to generate electricity for smaller scale systems (e.g., for a human-carried power unit).

Experimental Results

Techniques described herein were used to fabricate and test a scale-model micro-thruster 700 (FIG. 7) that uses homogeneous catalysis. In these experiments, 85% hydrogen peroxide (the monopropellant) and a solution of deionized water and 25% ferric chloride (the aqueous catalyst) were pumped into a 5 mm×5 mm×20 mm striated-flow mixing catalyzation channel 704, via, respectively, monopropellant input 708 and catalyst input 712, at a flow rate of 40 mL/h and 10 mL/h, respectively. A computer model of micro-thruster 700 shown in FIG. 7 was built to simulate the flow of the two liquids into the mixing chamber. The results of these simulations show that at those flow rates, flow in the mixing chamber is laminar, with no turbulent mixing. An example of these simulation results is shown in FIG. 9 of U.S. Provisional Patent Application Ser. No. 62/256,175 filed on Nov. 17, 2015, and titled "MICROFLUIDIC HOMOGENEOUS CATALYSIS SYSTEMS AND METHODS, AND APPARATUSES INCORPORATING SAME" ("the '175 application"), which is incorporated herein by reference above.

Figure 7:
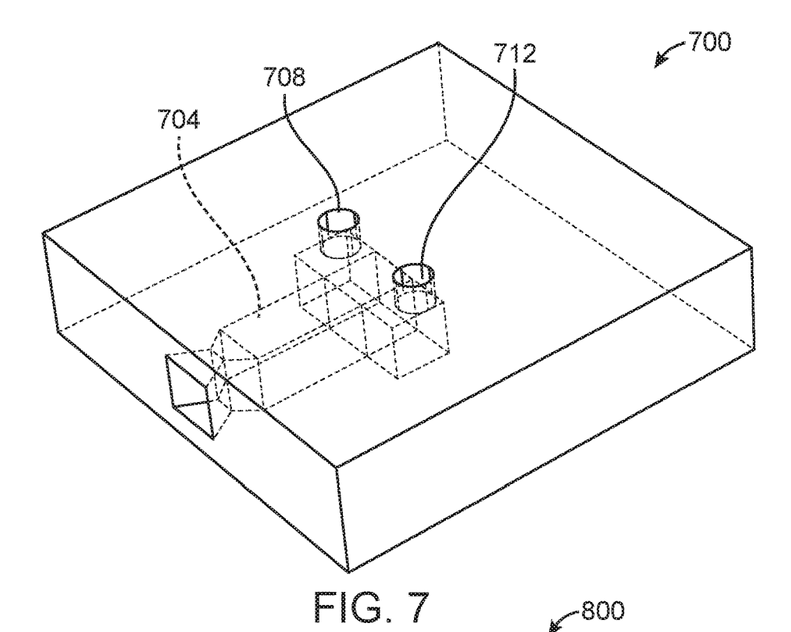
FIG. 7 is a partially transparent isometric view of a monolithic 3D printed experimental micro-thruster made in accordance with aspects of the present disclosure.
Figure 8:
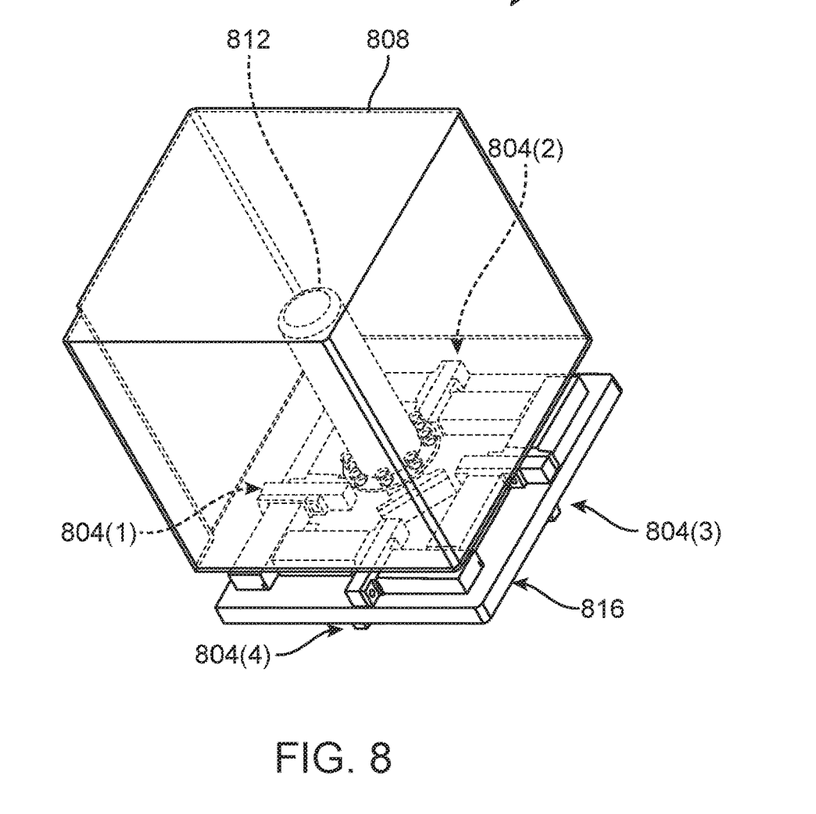
FIG. 8 is a partially transparent isometric view of a micro-thruster system utilizing multiple mixing catalyzation thrusters formed in a monolithic thruster body.

From that computational model, a prototype of micro-thruster 700 was 3D-printed out of a polymer. The prototype was connected, via plastic tubing (not shown), to syringe pumps (not shown) to control the flow rates of the monopropellant and catalyst into the respective monopropellant and catalyst inputs 708 and 712. A series of experiments were run using the hydrogen peroxide/aqueous catalyst noted above. As shown in FIG. 10 of the '175 application, during these experiments, only gaseous products were observed exiting the propelling nozzle.

Exemplary Micro-Thruster System

FIGS. 8 to 10D show an exemplary micro-thruster system 800 that uses four 1.25 N striated-flow mixing catalyzation type micro-thrusters 804(1) to 804(4) to produce a total of 5 N of thrust at full throttle. In this example, the catalyst (not shown) is an aqueous catalyst. Micro-thruster system 800 is particularly sized for a 4 kg (3U) CubeSat and uses two pressurized storage tanks: a monopropellant storage tank 808 and an aqueous catalyst storage tank 812. In this embodiment, micro-thrusters 804(1) to 804(4) are formed in a monolithic thruster body 816 that may be made, for example, using an additive manufacturing technique such as 3D printing. By virtue of its nature, a fully functional homogeneous-catalysis-based thruster or other structure can be made using any of a variety of additive manufacturing processes, such as vat polymerization, material jetting, binder jetting, powder-bed fusion, sheet lamination, and direct energy deposition, among others. This is so because a homogeneous-catalysis-based thruster or other structure does not require a solid catalyst, nor the complexities of forming a suitable catalyst bed. It is noted that in other embodiments, thruster body 816 need not be monolithic.

Figure 9:
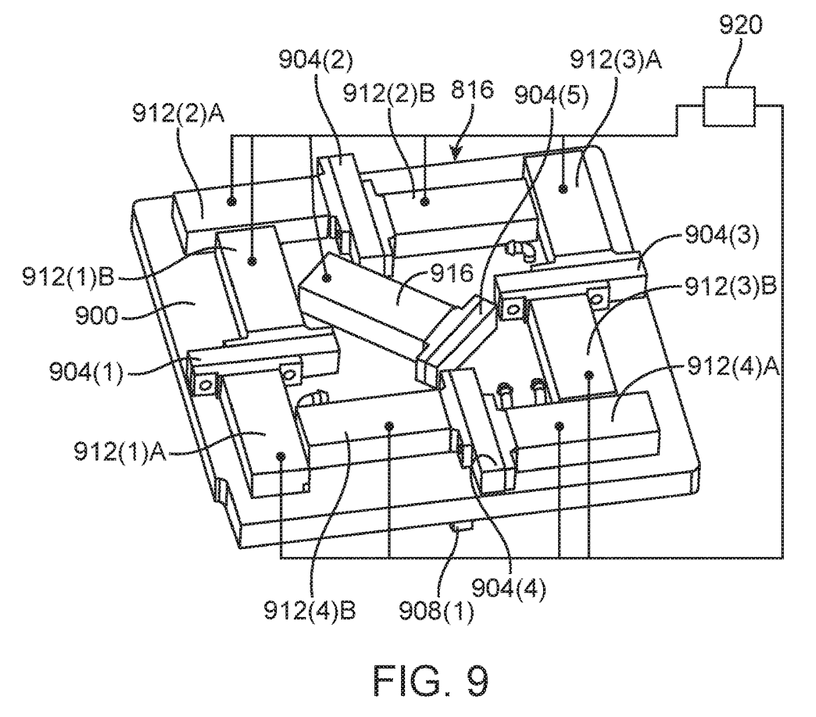
FIG. 9 is an enlarged partial isometric view/partial schematic view of the monolithic thruster body of FIG. 8, showing the monopropellant and catalyst valve assemblies secured to the monolithic thruster body.
Figure 10A:
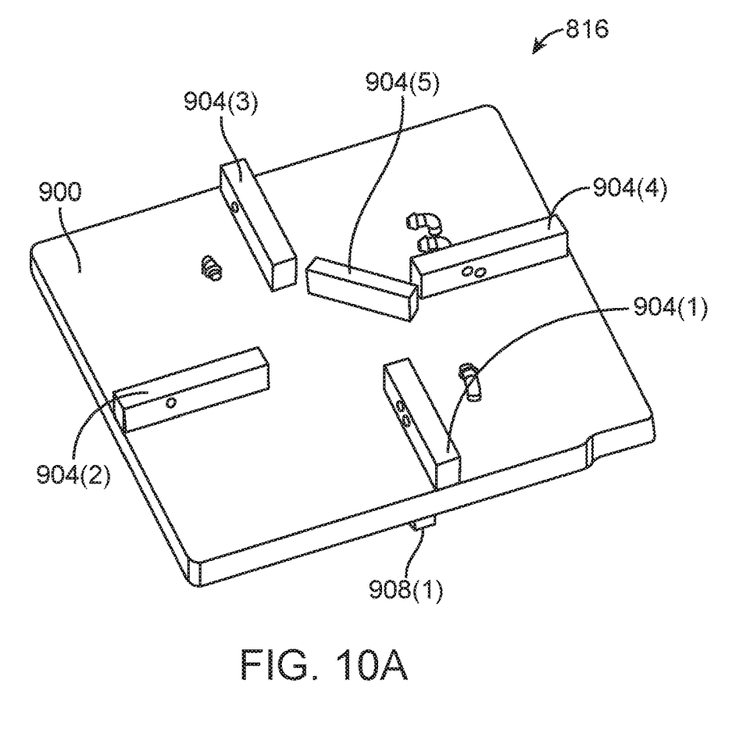
FIG. 10A is an enlarged isometric view showing the valve-assembly side of the monolithic thruster body of FIGS. 8 and 9.
Figure 10B:
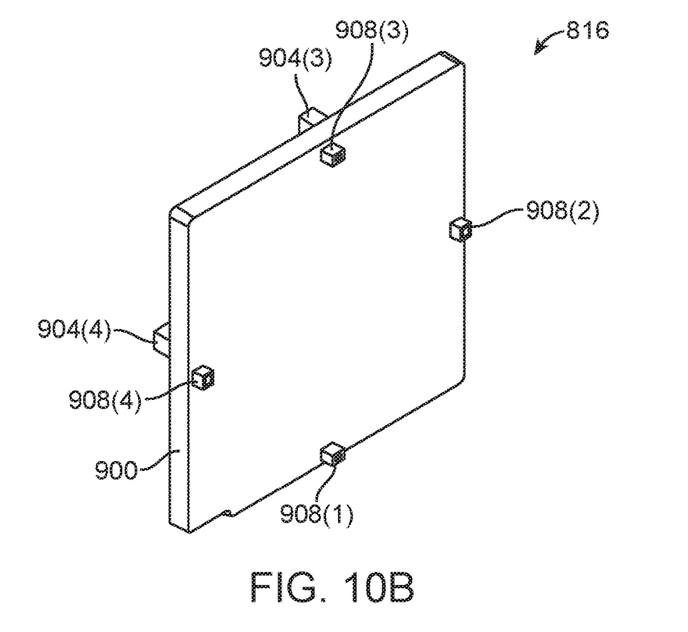
FIG. 10B is an enlarged isometric view showing the nozzle side of the monolithic thruster body of FIGS. 8 and 9.

As best seen in FIGS. 9, 10A, and 10B, thruster body 816 includes a plate 900, five valve blocks 904(1) to 904(5), and four nozzle bodies 908(1) to 908(4) corresponding, respectively, to the four micro-thrusters 804(1) to 804(4). Valve blocks 904(1) to 904(4) correspond, respectively, to micro-thrusters 804(1) to 804(4), and, as best seen in FIG. 9, each has two valve assemblies 912(1)A and 912(1)B, 912(2)A and 912(2)B, 912(3)A and 912(3)B, and 912(4)A and 912(4)B attached thereto. Valve assemblies 912(1)A, 912(2)A, 912(3)A, and 912(4)A are provided for controlling the flow of the monopropellant to corresponding respective ones of micro-thrusters 804(1) to 804(4), and valve assemblies 912(1)B, 912(2)B, 912(3)B, and 912(4)B are provided for controlling the flow of the aqueous catalyst to corresponding respective ones of the micro-thrusters. In this embodiment, valve assembly 916 is a primary control valve for the monopropellant required for NASA applications to provide redundancy should any one of monopropellant valves assemblies 912(1)A to 912(4)A fail. In the present embodiment, valve blocks 904(1) to 904(5) and nozzle bodies 908(1) to 908(4) are formed monolithically with plate 900.

Figure 10C:
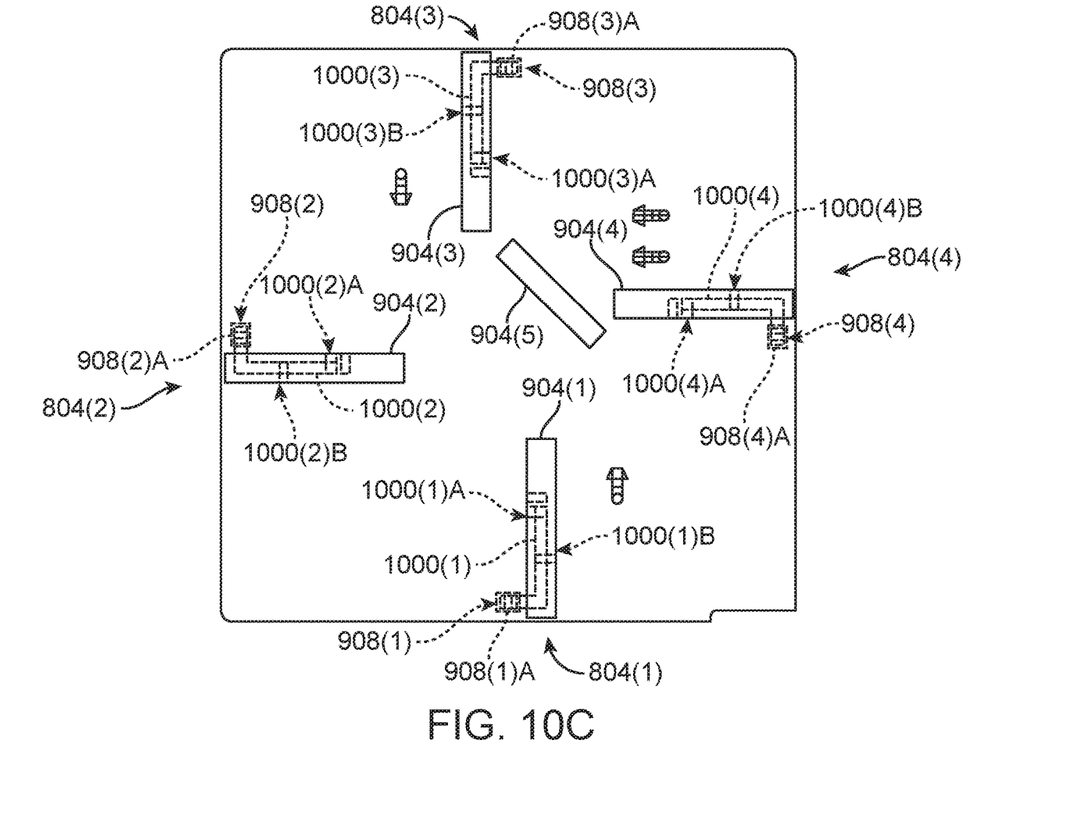
FIG. 10C is an enlarged plan view of the valve-assembly side of the monolithic thruster body of FIGS. 8 and 9.
Figure 10D:
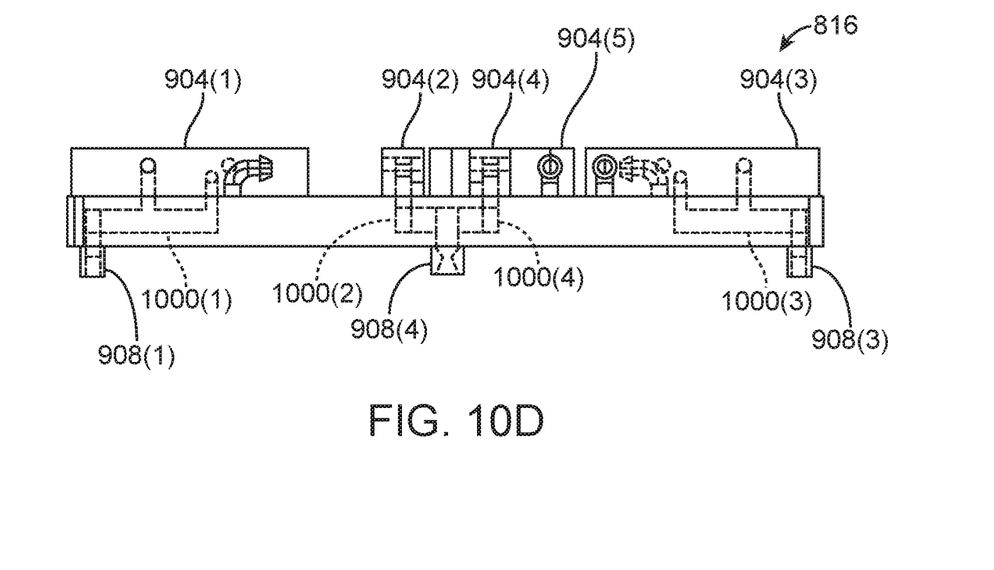
FIG. 10D is an enlarged side view of the monolithic thruster body of FIGS. 8 and 9.

As seen in FIGS. 10C and 10D, each micro-thruster 804(1) to 804(4) includes a corresponding striated-flow mixing catalyzation channel 1000(1) to 1000(4) having a monopropellant input 1000(1)A to 1000(4)A and a catalyst input 1000(1)B to 1000(4)B. Each monopropellant input 1000(1)A to 1000(4)A is in fluid communication with a corresponding one of monopropellant valve assemblies 912(1)A to 912(4)A (FIG. 9), each of which is in fluid communication with primary control valve assembly 916 to provide a fluid path from monopropellant storage tank 808 (FIG. 8) to the corresponding striated-flow mixing catalyzation channel 1000(1) to 1000(4). Each monopropellant valve assembly 912(1)A to 912(4)A controls the flow of the monopropellant to the corresponding striated-flow mixing catalyzation channel 1000(1) to 1000(4) to control the amount of thrust provided by that micro-thruster 804(1) to 804(4). Each catalyst input 1000(1)B to 1000(4)B is in fluid communication with a corresponding one of monopropellant valve assemblies 912(1)B to 912(4)B (FIG. 9), each of which is in fluid communication with catalyst storage tank 812 (FIG. 8) to provide a flow path for the catalyst from the catalyst storage tank to the corresponding striated-flow mixing catalyzation channel 1000(1) to 1000(4). Each catalyst valve assembly 912(1)B to 912(4)B controls the flow of the catalyst to the corresponding striated-flow mixing catalyzation channel 1000(1) to 1000(4) to control the amount of thrust provided by that micro-thruster 804(1) to 804(4). As seen in FIG. 9, a controller 920 is in operative communication with each valve assembly 912(1)A to 912(4)A, 912(1)B to 912(4)B, and 916 to provide the necessary control of the valve assemblies to achieve the desired amount of thrust from each one.

In one example, the monopropellant and catalyst are fed, via pressure in pressurized monopropellant and catalyst storage tanks 808 and 812 and under control of valve assemblies 912(1)A to 912(4)A, 912(1)B to 912(4)B, and 916, into each striated-flow mixing catalyzation channel 1000(1) to 1000(4) at a ratio of 6:1, using the striated flow technique. In this embodiment, valve assemblies 912(1)A to 912(4)A, 912(1)B to 912(4)B, and 916 are commercially available off-the-shelf (COTS) proportional valves, but other valves may be used. Plate 900 contains not only striated-flow mixing catalyzation channels 1000(1) to 1000(4) but also integrally formed channels for delivering the monopropellant and catalyst to valve assemblies 912(1)A and 912(1)B, 912(2)A and 912(2)B, 912(3)A and 912(3)B, and 912(4)A and 912(4)B (FIG. 9). Valve blocks 904(1) to 904(5) contain portions (not labeled) of striated-flow mixing catalyzation channels 1000(1) to 1000(4) for delivering monopropellant and catalyst to the striated-flow mixing catalyzation channels and that connect to the outlets (not shown) of valve assemblies 912(1)A and 912(1)B, 912(2)A and 912(2)B, 912(3)A and 912(3)B, and 912(4)A and 912(4)B. As seen in FIG. 10C, nozzle bodies 908(1) to 908(4) contain the nozzles 908(1)A to 908(4)A of the four micro-thrusters 804(1) to 804(4). It is noted that, in a plan view (such as in FIG. 10C), nozzles 908(1)A to 908(4)A are offset from the corresponding respective striated-flow mixing catalyzation channels 1000(1) to 1000(4). This is so due to the dimensional limitation of the CubeSat standards and the use of particular COTS valve assemblies 912(1)A and 912(1)B, 912(2)A and 912(2)B, 912(3)A and 912(3)B, and 912(4)A and 912(4)B that forced the offset. In other embodiments, the nozzles can be aligned with the striated-flow mixing catalyzation channels. In this example, each micro-thruster 804(1) to 804(4) is operated in a striated-flow regime and has one input for the monopropellant and one input for the catalyst. Consequently, each striated-flow mixing catalyzation channel 1000(1) to 1000(4) has a single interface between the two liquids for mixing therebetween.

Figure 11:
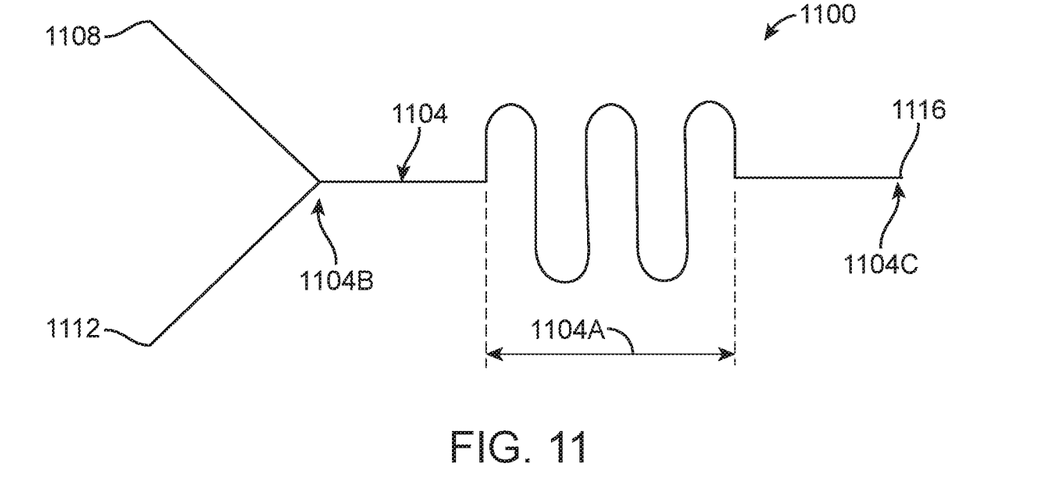
FIG. 11 is a schematic diagram of a combustion device made in accordance with the present disclosure and having a serpentine mixing catalyzation channel.

It is noted that all of the mixing catalyzation channels illustrated in FIGS. 2A to 4B, 7, 10C, and 10D are depicted as being straight. However, mixing catalyzation channels of the present disclosure do not need to be straight. For example, in some instantiations, it may be desirable or necessary to not utilize a straight mixing catalyzation channel. FIG. 11 illustrates a combustion device 1100 having a mixing catalyzation channel 1104 that includes a serpentine portion 1104A located between the monopropellant and catalyst inlets, here, a single monopropellant inlet 1108 and a single catalyst inlet 1112, at an inlet end 1104B and an outlet 1116 at an outlet end 1104C. In the embodiment shown, serpentine portion 1104A is illustrated as being centered in the length of mixing catalyzation channel 1104 and making up only a portion of the overall length of the mixing catalyzation channel. However, neither of these conditions is necessary. In addition, while serpentine portion 1104A is shown as having a regular undulating shape, the serpentine shape may have another configuration, such as zig-zag, generally folded back on itself (e.g., horizontally or skewed-to-horizontal relative to FIG. 11, etc.), and serpentine in three dimensions, and combinations thereof, among other configurations. Fundamentally, there is no limitation to the shape that serpentine portion 1104A of mixing catalyzation channel 1104 may have. A purpose of serpentine portion 1104A is to increase the length of mixing catalyzation channel 1104 without increasing the total length of combustion device 1100 or overall system (not shown) that may also include a nozzle and one or more of each of a monopropellant storage reservoir (e.g., tank) and a catalyst storage reservoir (e.g., tank). The specific design of serpentine portion 1104A (i.e. radiuses of curvature of bends, directions of bends, mixing length, etc.) is dependent on the characteristics of the monopropellant/liquid catalyst (not shown) and any spatial constraints and would therefore necessarily vary between different designs while accomplishing the same function.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A catalyzation system, comprising:
   a liquid monopropellant source containing a liquid monopropellant, wherein the liquid monopropellant is an oxidizer;
   a liquid catalyst solution source containing a liquid catalyst solution, wherein the liquid catalyst solution includes;
   a catalyst selected to catalyze decomposition of the oxidizer, and a combustible polar solvent containing oxygen to promote combustion;
   an elongated mixing catalyzation channel having:
   a hydraulic diameter less than 5 mm;
   a liquid monopropellant inlet in fluid communication with the liquid monopropellant source; and
   a liquid catalyst solution inlet in fluid communication with the liquid catalyst solution source and located proximate to the liquid monopropellant inlet; and
   a flow control system designed and configured to control flow of each of the liquid monopropellant and the liquid catalyst solution to, respectively, the liquid monopropellant inlet and the liquid catalyst solution inlet so as to create one of either 1) striated laminar flow and 2) slug flow in the elongated mixing catalyzation channel.

2. The catalyzation system according to claim 1, wherein the hydraulic diameter is between 500 µm and 5 mm, and the flow control system is designed and configured to control flow of each of the liquid monopropellant and the liquid catalyst solution so as to create striated laminar flow in the elongated mixing catalyzation channel.

3. The catalyzation system according to claim 1, further comprising a gas source containing a gas, wherein:
   the hydraulic diameter is between 5 µm and 500 µm;
   the elongated mixing catalyzation channel has a gas inlet in fluid communication with the gas source; and
   the flow control system is designed and configured to control flow of each of the liquid monopropellant, the liquid catalyst solution, and the gas to, respectively, the liquid monopropellant inlet, the liquid catalyst solution inlet, and the gas inlet so as to create the slug flow in the elongated mixing catalyzation channel.

4. The catalyzation system according to claim 1, wherein the elongated mixing catalyzation channel has a serpentine geometry to increase a residence time of the liquid monopropellant and the liquid catalyst solution in the elongated mixing catalyzation channel without increasing total system dimensions.

5. The catalyzation system according to claim 1, wherein the combustible polar solvent contains alcohol.

6. The catalyzation system according to claim 5, wherein the liquid monopropellant is selected from the group consisting of a hydrogen peroxide based monopropellant, a hydroxylammonium-nitrate (HAN) based monopropellant, and an ammonium dinitrate (ADN) based monopropellant.

7. The catalyzation system of claim 1, wherein the liquid monopropellant and the combustible polar solvent have a ratio relative to one another in the elongated mixing catalyzation channel, and the flow control system is further designed and configured to control the ratio between the liquid monopropellant and the combustible polar solvent so as to control relative amounts of the decomposition and combustion.

8. A propulsion thruster, comprising:
   the catalyzation system according to claim 1, wherein the elongated mixing catalyzation channel:
   has a longitudinal length and a first end and a second end spaced from one another along the longitudinal length, and the liquid monopropellant inlet and the liquid catalyst solution inlet are located proximate the first end; and an outlet located at the second end; and
   a propulsion nozzle in fluid communication with the outlet of the elongated mixing catalyzation channel.

9. The propulsion thruster of claim 8, wherein the liquid monopropellant and the combustible polar solvent have a ratio relative to one another in the elongated mixing catalyzation channel, and the flow control system is further designed and configured to control the ratio between the liquid monopropellant and the combustible polar solvent so as to control relative amounts of the decomposition and the combustion occurring within the elongated mixing catalyzation channel and, correspondingly, an amount of thrust provided by the propulsion thruster.

10. The catalyzation system of claim 6, wherein:
    the liquid monopropellant is a hydrogen peroxide based monopropellant and the catalyst is selected from the group consisting of $Fe(III)Cl_3$, $Fe(II)Cl_3$, $MnO_4$, and KI; or
    the liquid monopropellant is a hydroxlammonium-nitrate (HAN) based monopropellant and the catalyst is selected from the group consisting of $Ir/A_2O_3$ and $Pt/A_2O_3$; or
    the liquid monopropellant is an ammonium dinitramide (ADN) based monopropellant and the catalyst is selected from the group consisting of $NH^{4+}$ and $H^{2+}$.

11. The propulsion thruster according to claim 8, further comprising a gas source containing a gas, wherein:
    the hydraulic diameter is between 5 µm and 500 µm; and
    the elongated mixing catalyzation channel has a gas inlet in fluid communication with the gas source; and
    the flow control system is designed and configured to control flow of each of the liquid monopropellant, the liquid catalyst solution, and the gas to, respectively, the liquid monopropellant inlet, the liquid catalyst solution inlet, and the gas inlet so as to create the slug flow in the elongated mixing catalyzation channel.

12. The propulsion thruster according to claim 8, wherein the elongated mixing catalyzation channel has a serpentine geometry to increase a residence time of the liquid monopropellant and the liquid catalyst in the elongated mixing catalyzation channel without increasing total system dimensions.

13. The propulsion thruster according to claim 8, wherein the liquid catalyst solution contains an alcohol.

14. The propulsion thruster according to claim 13, wherein the liquid monopropellant comprises hydrogen peroxide.

15. A spacecraft, comprising:
- a liquid monopropellant storage reservoir containing a liquid monopropellant, wherein the liquid monopropellant is an oxidizer;
- a liquid catalyst solution storage reservoir containing a liquid catalyst solution, wherein the liquid catalyst solution includes a catalyst selected to catalyze decomposition of the oxidizer; and
- a combustible polar solvent containing oxygen to promote combustion;
- a propulsion thruster that includes:
- an elongated mixing catalyzation channel having:
    - a hydraulic diameter less than 5 mm;
    - a liquid monopropellant inlet in fluid communication with the liquid monopropellant storage reservoir;
    - a liquid catalyst solution inlet located proximate to the liquid monopropellant inlet, the liquid catalyst solution inlet in fluid communication with the liquid catalyst solution storage reservoir; and
    - an outlet located distally from the liquid monopropellant inlet and the liquid catalyst solution inlet; and
- a propelling nozzle located proximate to the outlet of the elongated mixing catalyzation channel and in fluid communication with the elongated mixing catalyzation channel; and
- a flow control system designed and configured to control flow of each of the liquid monopropellant and the liquid catalyst solution to, respectively, the liquid monopropellant inlet and the liquid catalyst solution inlet so as to create one of either 1) striated laminar flow and 2) slug flow in the elongated mixing catalyzation channel.

16. The spacecraft according to claim 15, wherein the hydraulic diameter is between 500 μm and 5 mm, and the flow control system is designed and configured to control flow of the liquid monopropellant and the liquid catalyst solution so as to create the striated laminar flow in the elongated mixing catalyzation channel.

17. The spacecraft according to claim 15, further comprising a gas source containing a gas, wherein:
- the hydraulic diameter is between 5 μm and 500 μm;
- the elongated mixing catalyzation channel has a gas inlet in fluid communication with the gas source; and
- the flow control system is designed and configured to control flow of each of the liquid monopropellant, the liquid catalyst solution, and the gas to, respectively, the liquid monopropellant inlet, the liquid catalyst solution inlet, and the gas inlet so as to create the slug flow in the elongated mixing catalyzation channel.

18. The spacecraft according to claim 15, wherein the liquid catalyst solution contains an alcohol.

19. The spacecraft according to claim 15, herein the liquid monopropellant comprises hydrogen peroxide.

20. The spacecraft of claim 15, wherein the liquid monopropellant and the combustible polar solvent have a ratio relative to one another in the elongated mixing catalyzation channel, and the flow control system is further designed and configured to control the ratio between the liquid monopropellant and the combustible polar solvent so as to control relative amounts of the decomposition and the combustion occurring within the elongated mixing catalyzation channel and, correspondingly, an amount of thrust provided by the propulsion thruster.

* * * * *

UNITED STATES PATENT AND TRADEMARK OFFICE
CERTIFICATE OF CORRECTION

PATENT NO. : 10,794,332 B2
APPLICATION NO. : 15/354508
DATED : October 6, 2020
INVENTOR(S) : Kevin R. Gagne et al.

It is certified that error appears in the above-identified patent and that said Letters Patent is hereby corrected as shown below:

In the Claims

Column 13, Line 37, Claim 1, the ";" should be replaced with a ":".

Column 14, Line 11, Claim 5, the word "an" should be added following the word "contains".

Column 14, Line 23, Claim 7, the word "the" should be added after the word "and".

Column 16, Line 25, Claim 19, the word "herein" should be replaced with the word "wherein".

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*